COMBINATION CLOCK AND TAPE PLAYER

Filed Oct. 21, 1966 Sheet 1 of 4

INVENTOR.
DONALD W. MATTESON
BY Price & Heneveld
ATTORNEYS

INVENTOR.
DONALD W. MATTESON
BY Price & Heneveld
ATTORNEYS

INVENTOR.
DONALD W. MATTESON

BY Price & Heneveld

ATTORNEYS

INVENTOR.
DONALD W. MATTESON
BY [signature]
ATTORNEYS

United States Patent Office 3,420,051

Patented Jan. 7, 1969

3,420,051

COMBINATION CLOCK AND TAPE PLAYER

Donald W. Matteson, Jackson, Mich., assignor to Clement Davis and Donald W. Matteson, both of Jackson, Mich.

Filed Oct. 21, 1966, Ser. No. 588,605

U.S. Cl. 58—14 2 Claims

Int. Cl. G04b *21/08*

ABSTRACT OF THE DISCLOSURE

A combination clock and tape player wherein an electric clock is mounted in a cabinet having speakers located at each side of the clock and endless tape playing mechanism is located within the clock housing accessible from the top of the housing. Electric switch means actuated by the clock serve to initiate operation of the tape to produce an audible signal, and a control signal located upon a second track of the tape serves to terminate operation of the tape movement.

For some time audio signals, such as chimes, have been employed in conjunction with timepieces to indicate certain times of the day, for example, the hour, half-hour, and often the quarter-hour. Throughout the years, craftsmen in the watchmaker's art have been employed to make timepieces which are attractive in appearance, pleasing in sound, and which properly operate to indicate the time of day. A well-known timepiece of this type is the so-called "Grandfather" clock which is often five, six and even seven feet tall in order to accommodate the complicated mechanisms employed for operating the clock and the audio mechanism.

One disadvantage of the "Grandfather" clock is its size. Another disadvantage is the high cost of the same.

Many attempts have been made to devise different types of so-called chime clocks. But to our knowledge no successful, smaller, less expensive type of clock has yet been devised.

The object of this invention is to provide a smaller, low-cost combination clock and audio device wherein a tape player is combined with the clock mechanism for producing chimes or other melodies at predetermined times as shown on the clock. This apparatus is producible at a fraction of the cost of the more expensive timepieces of this general nature.

Another object of the invention is to provide a combination clock and tape player capable of high fidelity reproduction of chime melodies of world famous chime clocks such as "Big Ben" in London, England.

Another object of this invention is to provide a combination clock and tape player which can be utilized not only for the purpose of playing chimes or other audio signals in response to particular times on the clock, but also can be utilized as a conventional tape player, either monaural or binaural.

A further object of this invention is to provide a combination clock and tape player which has a unique combination of elements which produces a nice appearing and operable unit which can be manufactured at relatively low cost.

In accordance with this invention the audio signals employed with the clock of the invention are stored upon the magnetic tape in such a fashion that there is extremely accurate timing of the audio signals produced in conjunction with the time showing on the clock. This invention also provides a means for conserving the space on the tape so that a number of different audio signals can be played at different times in the same manner as is done by more expensive so-called chime clocks of the "Grandfather" type.

An additional object of this invention is to provide a unique drive motor or timing circuit for controlling the operation of the tape drive motor. This circuit within certain aspects of this invention provides a means for accurately timing the various audio signals on the tape so that they are correlated with the time on the clock.

Still other objects of this invention relate to an actuator for the clock motor which puts into operation and controls the starting of the tape drive motor. Still an additional object of this invention is to provide a novel tape player mechanism especially adapted for use in the combination of this invention and so arranged that at least two conventional types of tape cartridges can be used on such player mechanisms.

These and other objects of this invention arising from the details and relationship of the components of the apparatus as herein described will become apparent from the following description and the accompanying drawings wherein.

Figures 1, 2, 3, 4:
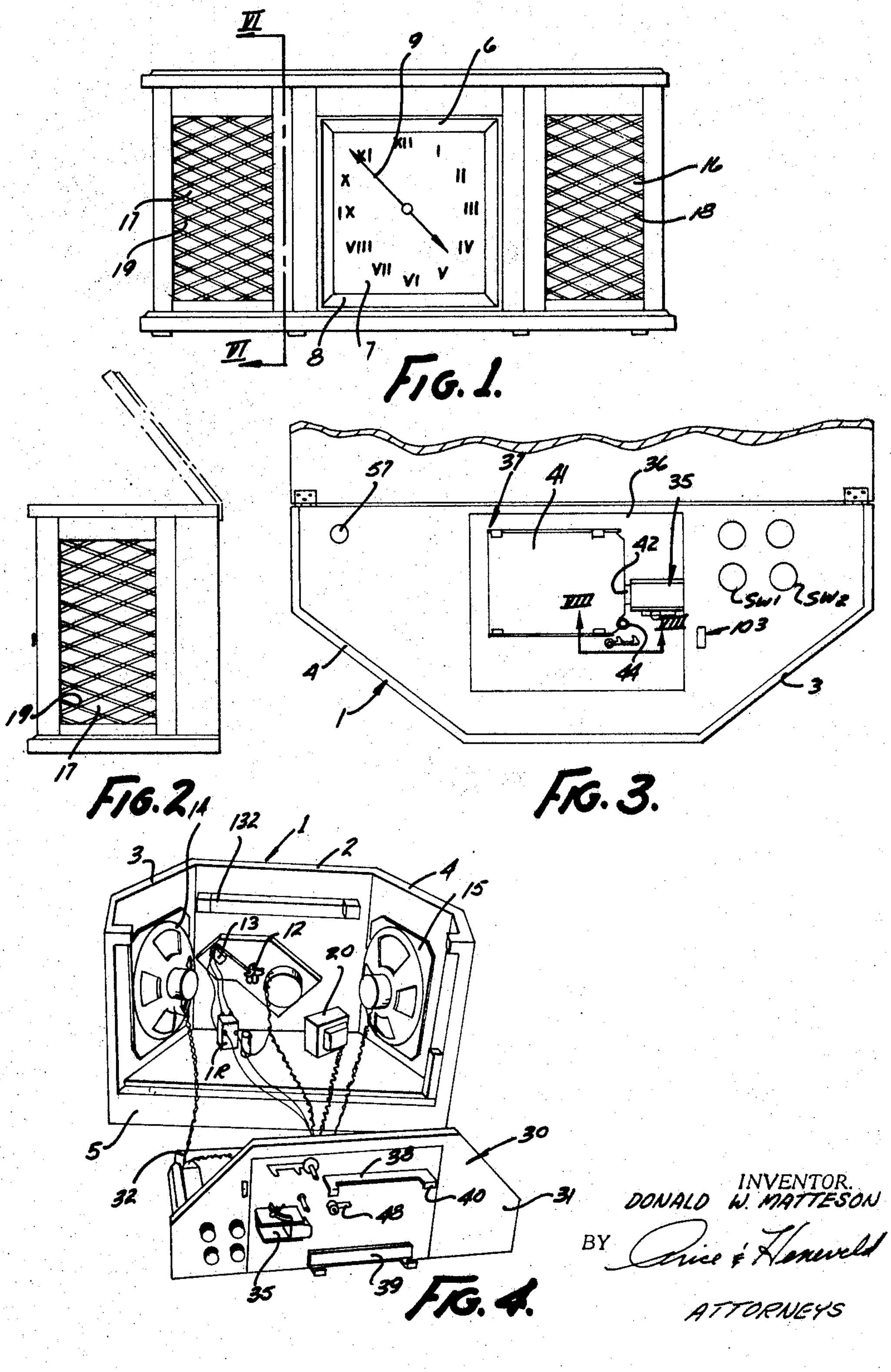
FIG. 1 is a front elevational view of the combination clock and tape player.
FIG. 2 is a side elevational view of the combination clock and tape player.
FIG. 3 is a plan view of the clock and tape player with the top open and displaying the tape player deck.
FIG. 4 is a perspective view of the unit with the tape player deck and circuit board removed and illustrating the components within the cabinet.
Figure 11:
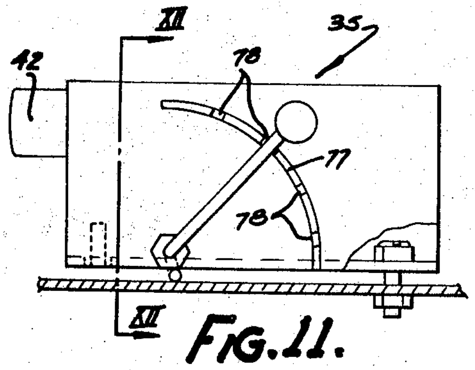
Figure 13:
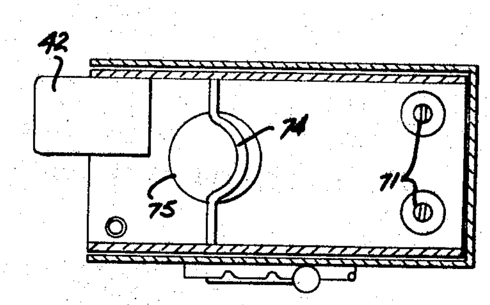
Figure 12:
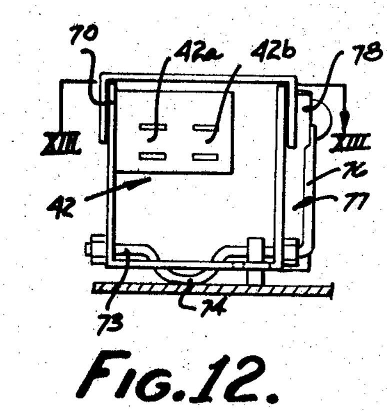
Figure 10:
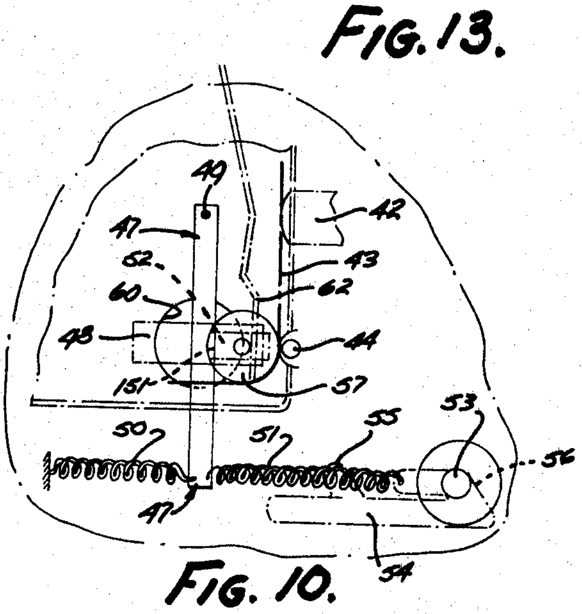
Figure 9:
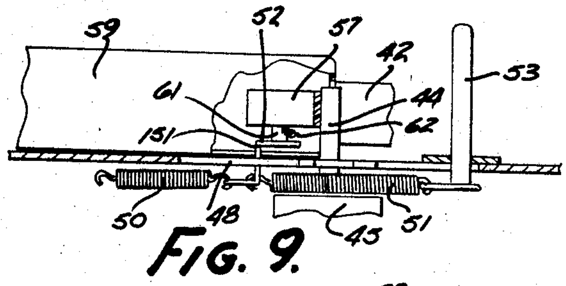
Figure 8:
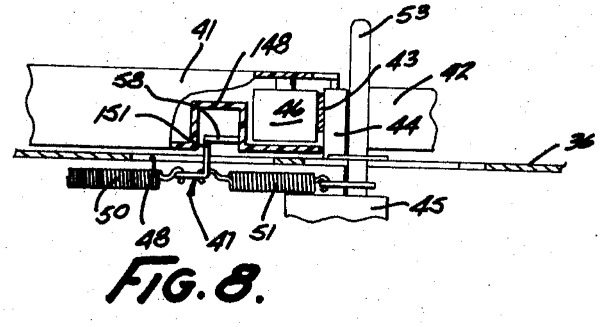
Figure 14:
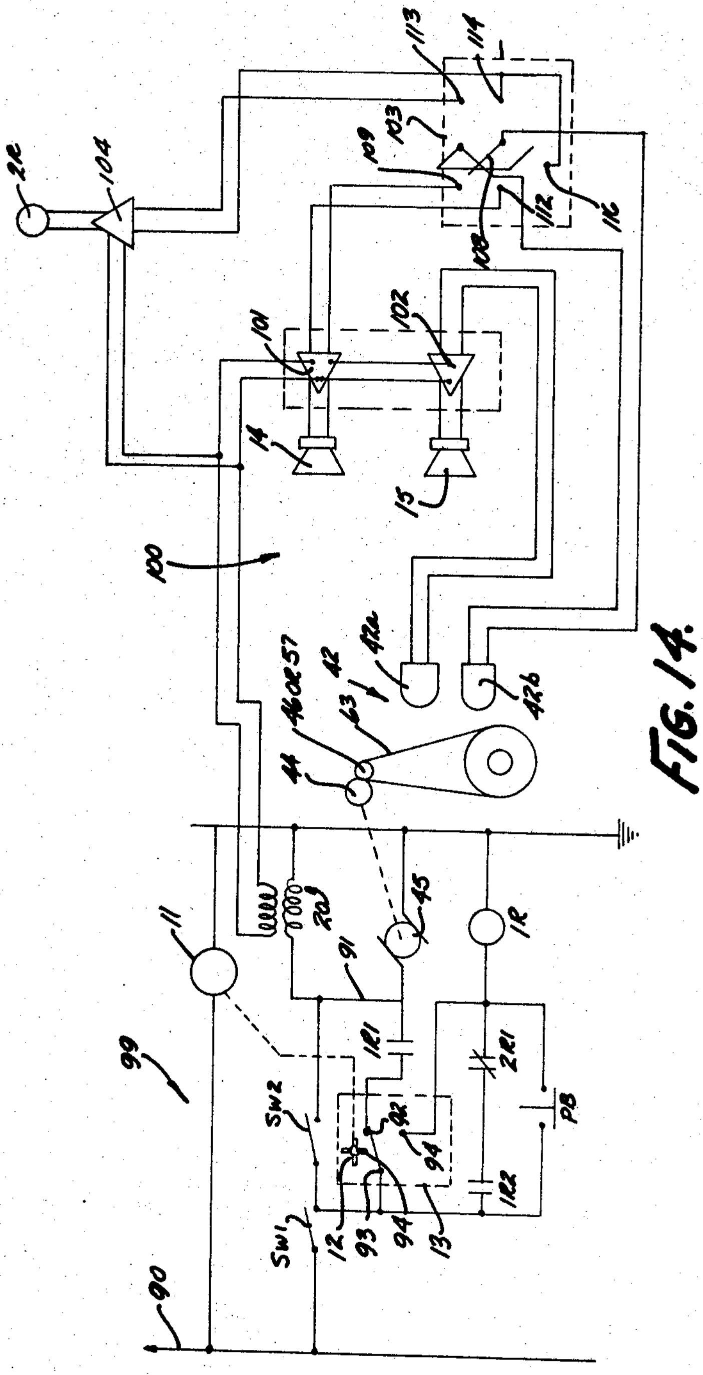

FIGS. *7a*, *7b* and *7c* are schematic drawings of the clock cam mechanism and the switch which it actuates;

FIG. 8 is a partial cross-sectional view of a portion of the tape player mechanism taken along the section lines VIII—VIII of FIG. 3;

FIG. 9 is a partial cross-sectional view very similar to FIG. 8 but showing the use of a different tape cartridge;

FIG. 10 is a plan view of the tape mechanism utilized in conjunction with the tape cartridge as illustrated by FIG. 9;

FIG. 11 is a side elevational view of the tape player head assembly;

FIG. 12 is a cross-sectional view of the tape player head assembly taken along the section lines XII—XII of FIG. 11;

FIG. 13 is a cross-sectional view of the tape player head assembly taken along the plane XIII—XIII of FIG. 12;

FIG. 14 is a schematic of the electrical circuit employed in the invention; and

Figure 15:
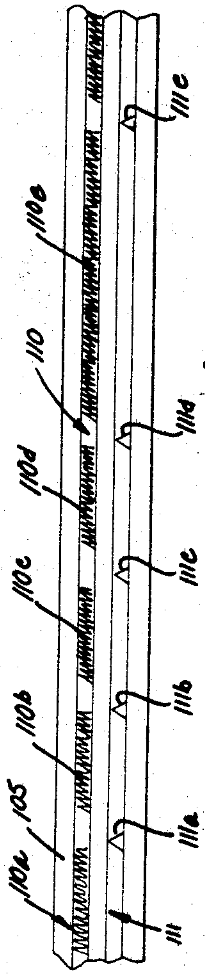

FIG. 15 is a schematic of a tape used with this invention.

Referring to these drawings, reference numeral 1 designates the cabinet in which the combination clock and tape player is contained. This cabinet has the front wall 2 and the side walls 3 and 4. It will be noted that the side walls 3 and 4 have portions thereof arranged at an obtuse angle with respect to the front wall 2 for purposes which will be described hereinafter. All these walls are upstanding from and connected to the base 5.

The front wall 2 has an opening 6 therein in which is located the face 7 of a clock. This face is covered by a glass door 8 which can be opened to gain access to the hands 9 and 10 for setting the clock. The hands 9 and 10 are connected to a motor 11, which through a gear mechanism (not shown), also drives the cam 12 in synchronism with the hands.

This cam 12 is arranged to actuate a switch 13 in a manner which will be described in more detail hereinafter in conjunction with FIGS. *7a*, *7b* and *7c*.

Also mounted inside the cabinet on the walls 3 and 4 are the speakers 14 and 15. These speakers are mounted over openings in the side walls, which openings are covered by a fabric 16 and 17, respectively, over which is located the grill work 18 and 19, respectively. Thus any sound transmitted by the speakers 14 and 15 pass through the fabric 16, 17 and grill work 18 and 19.

A power pack or transformer 20 is also located inside the cabinet and mounted on the base 5 as is a relay 1R which will be described in more detail hereinafter.

Figure 6:
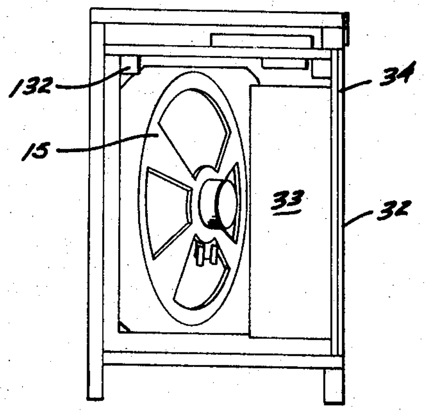
FIG. 6 is a cross-sectional view of the unit taken along the section line VI—VI.

In accordance with this invention, we provide an inverted L-shaped tape player assembly 30 which comprises a deck support 31 mounted in a horizontal position within the cabinet on the supports 131 and 132 a spaced distance below the top edges of the walls 2, 3 and 4 (FIG. 6) so as to provide a recess in which the tape player mechanism or so-called "deck" is located. Extending downwardly from the deck support 31 is a circuit board 32 on which is mounted substantially all the electrical components illustrated in box form by reference numeral 33 of the tape player circuit. The circuit board 32 is covered by a perforated backing board 34 secured to each of the rear side edges of the sides 3 and 4.

The tape player mechanism or so-called "deck" is of a unique design. It includes the tape head assembly 35 mounted on a plate 36 which in turn is mounted on the deck support 31. Also mounted on this plate 36 is the tape cartridge holder 37 which comprises the two upstanding side members 38 and 39 having spring like fingers 40 that hold the cartridge securely in place but permit it to be slid between the two members 38 and 39. Thus a cartridge such as shown in FIG. 3 and designated by reference numeral 41 is held in place in a position where the head 42 contacts the tape 43 within the cartridge 41 (see FIG. 8). In this position the tape is engaged by a drive shaft 44 which is driven by a motor 45 mounted underneath the plate 36.

In accordance with one aspect of this invention, the tape deck is so constructed that it can be utilized in conjunction with either of the two most conventional type of tape cartridges. One of these types has a pressure roller incorporated within the cartridge and the other does not.

FIG. 8 shows the construction being utilized with a tape cartridge having a self-contained pressure roller 46. This tape cartridge 41, which is a well-known tape cartridge sold by the Lear-Jet Corporation and identified by the trademark "Lear-Jet Pak," has an endless tape contained therein which passes over the pressure roller 46 located at the front edge of the cartridge. Also at the front edge there are openings exposing the tape. In accordance with this invention, the tape player head 42 extends into one of these openings to contact the tape therein.

In the use of the tape cartridge 41, the conventional way of forcing the tape against the drive shaft and the head of the tape player mechanism is to provide an actuator member which extends into a detent located on one side of the cartridge. In accordance with this invention we have provided an actuation member 47 which extends through a slot 48 (FIG. 4) in the plate 36 and into a recess 148 formed in the bottom face of the cartridge 41. This actuating member 47 is pivotally mounted at one end on and beneath the plate 36 at the point 49 (FIG. 10). At the other end it is connected to two springs 50 and 51 exerting opposite biasing forces to the actuator 47. This actuator member 47 is Z-shaped in cross-section. Thus it is comprised of the lever 150, the offset portion 151 extending upwardly through the slot 48, and a second offset portion 52 extending over the plate 36. The offset portion 52 is the part of the actuator which actually contacts the cartridge for moving it into operative position.

As shown in FIG. 8 the spring 51 is also connected to an actuator handle 53 which is slidably mounted in the slot 54 having the detent portions 55 and 56.

In utilizing this mechanism with the tape cartridge 41 having a self-contained pressure roller, the actuator handle 53 is slid in the slot 54 to a position where it will seat in the detent portion 55 where it is held securely in that position.

When a tape cartridge, which does not have a self-contained roller is used, such as the type sold under the registered trademark "Fidelipak" and as disclosed in Patent Nos. 2,778,635; 2,778,636; 2,778,637; 2,778,880; and 2,876,005; a pressure roller 57 is secured on the offset portion 52 of the actuator 47. This roller 57 is generally stored on the deck support 36 as shown by FIG. 3. It has a threaded end which fits into the tapped opening 58 of offset portion 42. When so secured in place, the cartridge 59 which has the opening 60 on the bottom side thereof is placed over the roller 57. In this position the shaft or stud 61 is at the proper level for contacting a spring element 62 secured to the housing of the cartridge. With this particular type of cartridge the actuator handle 53 is slid along the slot 54 until in alignment with the detent portion 56. In this position the cartridge 58 has been pushed forward into proper operative position with relation to the driving shaft 44 and the head 42.

This tape player mechanism is especially adapted for use with eight track tapes which require four distinct positions of the head 42 (see FIGS. 11, 12, and 13). In order to accomplish this end, I have provided the tape head assembly 35 which includes a U-shaped housing 70 in which is secured the tape player head 42. This housing 70 is pivotally mounted at one end by a pair of bolts 71 with grommets 72 provided between the head of the bolt and the bottom of the housing in order to permit pivotal movement and provide for spring tension to return housing to lowest position. The pivotal position of the housing 70 and the head 42 is determined by a wire-like member 73 extending through the sides of the housing 70 and pivotally actuated by the handle 76. Intermediate the sides of the housing 70, the wire-like member 73 has an arcuate portion 74 extending through an opening 75 in the bottom of the housing 70. This arcuate portion 74 serves as a cam to cam the housing upwardly depending upon the rotatable position of the portion 74. The handle 76 rides along an arcuate flange 77 having a plurality of cutout portions 78 provided to receive the handle 76 and hold it in position. There is sufficient flexibility in the handle so that it can be pulled out of the cutouts 78 and moved to any one of the cutouts along the arcuate flange 77. It should be obvious that rotation of handle 76 and locating such within the cutouts 78 changes the rotational position of the arcuate portion 74 and thus the pivotal position and the location or height of the head 42.

Figures 5, 7A, 7B, 7C:
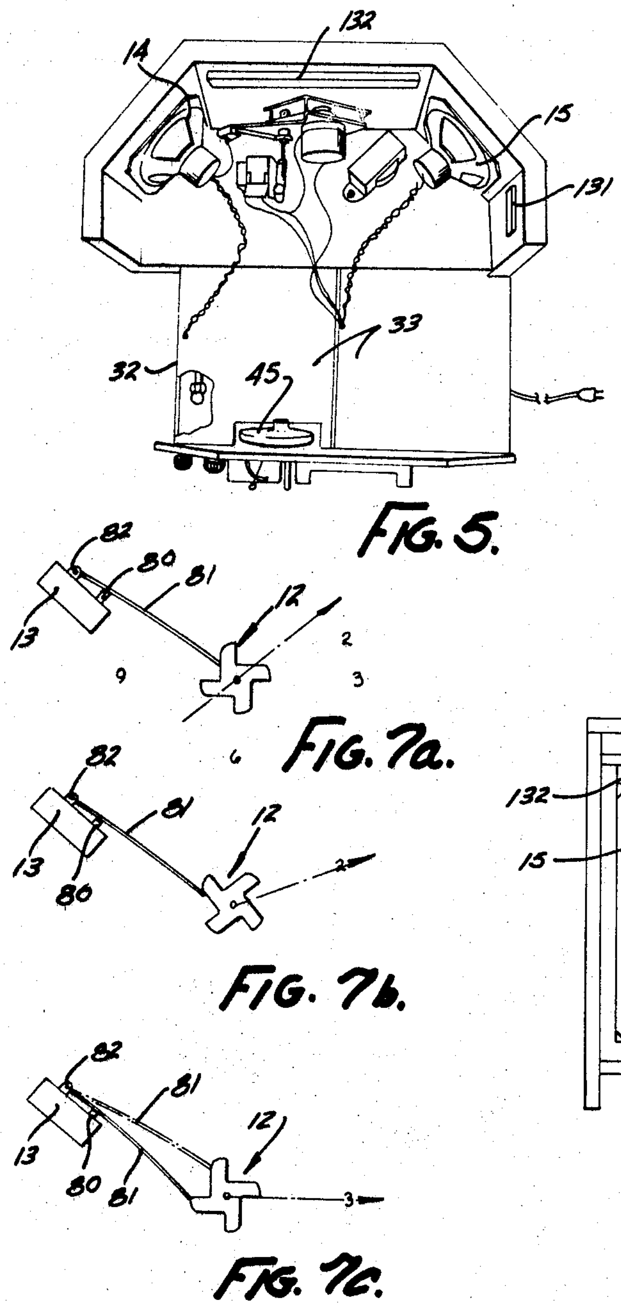
FIG. 5 is a plan view of the unit with the deck and circuit board removed and laid on its back.

FIGS. 7*a*, 7*b* and 7*c* disclose the specific shape of the cam for the clock motor. This cam 12 has four arms extending therefrom. The ends of the arms each comprise a portion of a circle having its center at O, the point about which the cam rotates. Each arm extends parallel to a radius of the circle but is offset from such radius. We have discovered that this type of cam in combination with the switch 13 which has a plunger 80 and an actuator arm 81 pivotally mounted at 82 is important to provide a precise and instantaneous action without any hunting or chattering. The arcuate portions on the ends of the arms are so arranged in relation to the arms of the cam with relation to the actuating arm of the switch so that when the arm is released it is released instantaneously with a snap-like action. The construction as shown accomplishes this end.

FIG. 14 discloses the circuit diagrams for this invention. Reference numeral 90 designates the power line for the entire system including tape motor control circuit 99 and tape player circuit 100. Connected across this source of power and ground is the clock motor 11, power supply transformer 20, tape drive motor 45, and relay coil 1R. The power supply transformer 20 is in series with the switches SW1 and SW2. The tape drive motor 45 is in series through one path, including line 91, with switches SW2 and SW1 and through another path with the relay contacts 1R1, contacts 92 and 93 (which in one position of switch 13 is bridged by element 94) and the switch SW1. Relay coil 1R is connected in series through one path with the relay contacts 2R1, relay contacts 1R2 and switch SW1; and through another path with push button PB and switch SW1.

The tape player circuit 100 comprises the tape head 42 including two pickup elements or tape head elements **42*a* and 42*b*. It will be noted that the head element 42*a* is always connected to the amplifier 102 and speaker 15 whereas head 42*b* is connected through the two pole double throw switch 103 (also see FIG. 3) to either the amplifier 101 or 104. When switch handle 108 is thrown to the left to contact points 109 and 112 it is connected to amplifier 101 and speaker 14 so that both speakers are playing from the two tracks on the tape. Thus this is the position of the switch 103 when stereo is to be utilized. When chimes or other audio signals are to be used in conjunction with the clock, switch handle 108 is thrown to the right to contact points 113 and 114 connecting amplifier 104 and coil relay 2R into the system. Coil 2R controls the opening and closing of relay contacts 2R1**.

FIG. 15 shows a schematic of a tape 105 to be used for playing chimes or other audio signals in response to the time on the clock. This tape is shown as only having two tracks 110 and 111 with signals **110*a*, 110*b*, 110*c*, 110*d*, and 111*e* on track 110 and signals 111*a*, 111*b*, 111*c*, 111*d*, and 111*e* on track 111. Signals 110*a* etc. represent the tunes to be played by the tape player. Pulse signals 111*a*** etc. are utilized to stop the tape player motor at the end of such tunes.

*Operation*

Having disclosed all the component parts of my invention, the operation will now be described.

It should be understood that the tape player can be disconnected from the clock and used for playing music. If the tape player is to be used only for playing music, which quite frequently may be done for a period of time and then returned to clock operation, the tape cartridge is placed between the elements 38 and 39 (FIGS. 3 and 4). As previously described, if the self-contained tape cartridge is to be utilized, the pressure roller 57 stored on the support 31 is not utilized. In this case the cartridge after being placed between the side elements 38 and 39 is moved forwardly by actuation of the actuator handle 53 to a position within the detent portion 55 (FIG. 10), the switch 103 is switched to the left as viewed in FIG. 14 connecting the amplifier 101 to head element **42*b*, and then the switches SW1 and SW2 are closed. The same steps are taken when a tape cartridge without a self-contained pressure roller is used except that the pressure roller 57 is screwed onto the offset portion 52 of the actuator 47 before placement of the cartridge and then the actuator handle 53 is moved to a position within the detent portion 56. In either case, the vertical position of head 42 is adjusted to select the desired tracks by movement of handle 76 into the selected one of the four cutouts 78 of the flange 77**.

After using only the stereo for listening pleasure, or in the event one desires only to use the apparatus for playing chimes or other audio signals in response to a certain time of day, switch 103 is thrown to the right as viewed in FIG. 14. This connects head element **42*b* to the amplifier 104. In addition, switch SW1 is closed and SW2 opened. In accordance with the disclosure herein, the cam 12 and switch 13 are so related that during a period of ten minutes of each quarter-hour, that is between 5 minutes and 15 minutes after the hour, between 20 minutes and 30 minutes after, between 35 minutes and 45 minutes after, and between 50 minutes after and the hour, the switch 13 is actuated. During this actuation the switch element 94 is actuated downwardly as viewed in FIG. 14 to bridge the contacts 93 and 92 and close the circuit through coil 1R. Upon closing of the coil 1R, relay contacts 1R1 and 1R2 are closed creating a holding circuit through the coil 1R. Subsequently, the cam 12 releases the arm 81** (FIGS. 7*a*, 7*b* and 7*c*) of the switch 13 with a snap-like action which immediately causes the switch element 94 (FIG. 14) to bridge the contacts 92 and 93. At this time, the relay contacts 1R1 are still closed by reason of coil 1R being energized through the holding circuit and as a result a circuit is closed through switch SW1, switch contacts 93–92, relay contacts 1R1 and motor 45. This energizes motor 45 causing the tape to move past the two head elements **42*a* and 42*b*. Element 42*a* is engaged with track 110 causing the chime or other audio signals to be transmitted to amplifier 102 where they are amplified and transmitted through speaker 15. The chime tape has on it, as illustrated by FIG. 15, track 111 having a series of pulses which are impressed on the head 42 simultaneously with the ending of the chimes being played through the head 42*a*. This pulse is of sufficient duration so that after being amplified by amplifier 104 coil 2R is energized causing contacts 2R1 to open. This immediately de-energizes coil 1R opening relay contacts 1R1 and 1R2** and thus stopping the tape motor instantaneously. This cycle is then repeated every quarter-hour.

In the event the signals on the chime tape are not properly set to correspond with the time on the clock, the operator can easily "set" or bring the chimes back into synchronism with the time on the clock by doing one of two things. If the tape is just a few chime tunes behind, the operator pushes the push button PB. This immediately will cause the playing of one chime tune and this can be continued until such time as the chime tunes are matched with the time on the clock. If there is a wide variance between the time on the clock and the tune next to be played from the tape, the operator can close switch SW2 which will cause the tape player to play continuously through a number of tunes. It is contemplated that a combination of these two operations are preferred. In other words, if the time is 12 o'clock noon and the chime tune being played is for 6 o'clock, the operator will close SW2 causing the tape player to play through to the chime tune which corresponds with 11:30. Then the operator will push on the push button PB twice until the proper tune for 12 o'clock noon is reached.

I claim:

1. A combination clock and tape player adapted to play an audio signal in response to movement of the clock hands to certain predetermined positions; a clock motor; an actuator means driven by said clock motor; a dual track magnetic tape, said tape having first and second signal-retaining tracks; tape drive means comprising an electric motor and a tape drive roller adapted to be rotated by said electric motor to drive said tape; an audio amplifier system including a first signal pickup head disposed adjacent said first tape track and a speaker; a pulse signal amplifier system including a second signal pickup head disposed adjacent said second tape track and a first switching means; a tape drive motor circuit; a second switching means within said tape drive motor circuit operated by said actuator means adapted to energize said tape drive electric motor; power supply means associated with said second switching means and amplifier systems, activation of said second switching means by said actuator means energizing said tape drive electric motor to drive said tape to permit said audio amplifier system to pick up and transmit the signal retained in said first track; said tape drive motor circuit including a relay having a coil connected in series across said power means with said second switching means; said relay having a first and second set of normally open contacts, said first set being connected in series across said power means with second switching means and said tape drive motor, and said second set connected in series across said power means with said relay coil and the first switching means, said first switching means controlling a portion of said tape drive motor circuit whereby upon said second signal pickup head sensing a pulse signal on said second track said second switching means is actuated to de-energize said tape drive motor.

2. The device of claim 1 in which a momentary push button switch is connected in parallel with said second set of contacts and said first switching means and in series across said power means with said relay coil.

References Cited

UNITED STATES PATENTS

| | | | |
|---|---|---|---|
| 1,545,641 | 7/1925 | Dube | 58—14 |
| 1,782,378 | 11/1930 | Bahr | 58—14 |
| 1,796,906 | 3/1931 | Zimmer | 179—6 |
| 2,066,041 | 12/1936 | Kiel | 274—11 |
| 2,109,962 | 3/1938 | Koski | 58—14 |
| 2,239,215 | 4/1941 | Banks | 58—14 |
| 2,396,409 | 3/1946 | Berzer | 179—100.2 |
| 2,552,788 | 5/1951 | Hoover | 179—100.2 |
| 2,604,752 | 7/1952 | Delgado | 58—14 |
| 2,614,654 | 6/1953 | Offutt | 58—14 |
| 2,799,731 | 7/1957 | Straub | 179—100.2 |
| 3,059,063 | 10/1962 | Bailey et al. | 179—100.2 |
| 3,084,226 | 4/1963 | Moulic | 179—100.2 |
| 3,134,089 | 5/1964 | Bogoff et al. | 179—100.2 |
| 3,135,084 | 6/1964 | Kidder | 58—14 |
| 3,200,206 | 8/1965 | Johnson | 179—100.2 |
| 3,296,385 | 1/1967 | Shaw | 179—100.2 |

FOREIGN PATENTS

| | | |
|---|---|---|
| 1,058,473 | 3/1954 | France. |

RICHARD B. WILKINSON, *Primary Examiner.*

E. C. SIMMONS, *Assistant Examiner.*

U.S. Cl. X.R.

58—8